JAMES GALLOWAY.
Improvement in Coffee-Roasters.
No. 115,302.    Patented May 30, 1871.
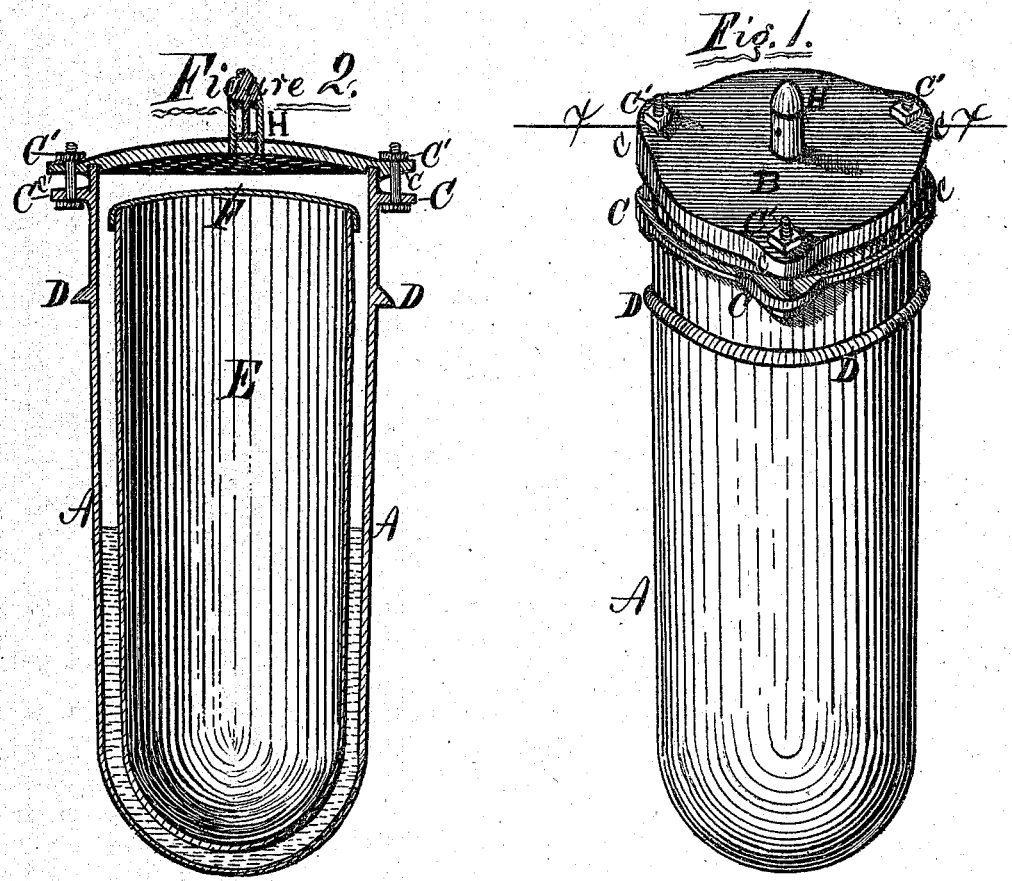

UNITED STATES PATENT OFFICE.

JAMES GALLOWAY, OF WEBSTER, ILLINOIS.

IMPROVEMENT IN COFFEE-ROASTERS.

Specification forming part of Letters Patent No. 115,302, dated May 30, 1871.

I, JAMES GALLOWAY, of Webster, in the county of Hancock and State of Illinois, have invented certain Improvements in Coffee-Roasters, of which the following is a specification:

Nature and Objects of the Invention.

The nature of my invention relates to improvements in the method of browning or roasting coffee; and the invention consists in subjecting the berries to the action of the heat of steam in browning or roasting them, the object being to roast the grains uniformly and evenly, thereby dispersing the fragrant volatile-oil caffeine through the solid substance of the grain and preserving it entire without dispelling any portion of it, as is the case when roasted in the usual manner, whereby a portion of entire grains and parts of grains are over-roasted and the fragrance expelled. The uniform roasting also tends to modify the caffeic acid more regularly than the ordinary methods, all as hereinafter fully described.

Description of the Accompanying Drawing.

Figure 1 is a perspective view of a vessel for carrying out my invention. Fig. 2 is a vertical sectional view of Fig. 1 on the line $x\ x$.

General Description.

A represents the roaster or outer vessel used in my improved method. This vessel A may be of any desired or suitable shape for placing in stoves or other heaters, and may be formed of any suitable material. It is shown in the drawing as a cylinder, with its lower end rounded and closed and its upper end open and provided with a flange, D, for sustaining it in the pot-hole of a stove or other place. B represents a cap or cover for the vessel A. The cover B contains a circular groove on its under side (as shown at Fig. 2) corresponding with and fitting neatly over the top of the vessel A. The cap B is secured in place by means of bolts and nuts C', which pass through lugs C C C C on the lid and on the sides of the vessel A, as plainly shown in the drawing. E is a can somewhat smaller than the vessel A, and provided with a neatly-fitting cap, F. H is a safety-valve.

The operation is as follows: The coffee is slightly moistened and placed in the can E. The cap F is then put in place and the can E put inside of the vessel A, the annular space between the vessels A and E being partly filled with water. The cap B is now put in place and secured by the bolts C' C' C', packing being used, if necessary, to form a steam-tight joint. The vessel A is now placed in the heater and the heat therein raised to about 340°, which may be indicated by a thermometer connected with the lid B. At a heat of 340° the coffee will be roasted in about fifteen minutes by the surrounding steam, and will be found to be uniformly and beautifully browned, with the valuable qualities all preserved.

The vessel E, when the roasting is completed, should be taken out and the lid be left on a few minutes until the coffee has cooled and re-absorbed the aromatic vapor in the can.

A safety-valve of any desired description may be placed in lid B.

It will be readily seen that by this method of roasting the finer qualities of the coffee are not only preserved, but a great saving is effected in all of the qualities.

Claim.

I claim as my invention—

Vessels A and B, constructed for the purpose of browning and roasting coffee by use of steam, in the manner substantially as set forth.

JAMES GALLOWAY.

Witnesses:
JOEL HOWD,
ANDREW THOMPSON.